United States Patent
Simpson

(10) Patent No.: US 7,944,961 B2
(45) Date of Patent: May 17, 2011

(54) SYSTEMS AND METHODS FOR IMPROVING PULL-IN PERFORMANCE IN GPS SIGNAL PROCESSING

(75) Inventor: Robert G. Simpson, Ellicott City, MD (US)

(73) Assignee: Honeywell International Inc., Morristown, NJ (US)

( * ) Notice: Subject to any disclaimer, the term of this patent is extended or adjusted under 35 U.S.C. 154(b) by 844 days.

(21) Appl. No.: 11/845,579

(22) Filed: Aug. 27, 2007

(65) Prior Publication Data

US 2009/0063050 A1    Mar. 5, 2009

(51) Int. Cl.
*H04B 1/69* (2011.01)
(52) U.S. Cl. ........ 375/149; 375/148; 375/150; 375/147; 375/142; 370/342; 370/515
(58) Field of Classification Search .................. 375/149, 375/150, 148, 147, 142; 370/342, 515
See application file for complete search history.

(56) References Cited

U.S. PATENT DOCUMENTS

| | | | |
|---|---|---|---|
| 5,917,866 A | | 6/1999 | Pon |
| 6,201,828 B1 * | | 3/2001 | El-Tarhuni et al. ........... 375/150 |
| 6,614,834 B1 * | | 9/2003 | Meng et al. .................... 375/149 |
| 6,735,242 B1 * | | 5/2004 | Kenney et al. ................. 375/150 |
| 7,420,506 B2 | | 9/2008 | Simpson |
| 2006/0039452 A1 * | | 2/2006 | Kim ............................... 375/148 |
| 2007/0121708 A1 * | | 5/2007 | Simpson ........................ 375/149 |

FOREIGN PATENT DOCUMENTS

EP    1724602 A1    11/2006

OTHER PUBLICATIONS

Kaplan, et al., Understanding GPS Principles and Applications, Jan. 1, 1990, pp. 142-150, XP002165743.
A. Wilde, The Generalized Delay-Locked Loop, Wireless Personal Communications, Springer, Dordrecht, NL, vol. 8, No. 2, Sep. 1, 1998, pp. 113-129, XP00765359.

* cited by examiner

*Primary Examiner* — Eva Y Puente
(74) *Attorney, Agent, or Firm* — Fogg & Powers LLC

(57) ABSTRACT

Systems and methods for avoiding non-linear behavior of conventional early-minus-late correlator-based code loop discriminators. The present invention provides a model of correlator behavior that takes into account whether both correlators are on the same side of the correlation peak or they straddle the peak. The result is a piecewise solution that can be stitched together quite readily to produce an extended range of linear response, thereby improving the pull-in capability of GPS code loops when closely spaced correlators are being used.

10 Claims, 5 Drawing Sheets

SYSTEMS AND METHODS FOR IMPROVING PULL-IN PERFORMANCE IN GPS SIGNAL PROCESSING

BACKGROUND OF THE INVENTION

In GPS receivers, pull-in performance refers to the ability of a tracking loop to converge to the desired state. A code loop can achieve the best pull-in performance when a code-loop discriminator output is linearly related to the temporal shift between the arriving code and the replica code produced by a local code generator. In conventional GPS receivers with early and late correlators separated by the width of a code chip, linear behavior in the discriminator can be achieved over an operating range of +/−½ the width of a code chip. However, it is widely recognized that better overall performance of the receiver can be achieved when the spacing between the early and late correlators are reduced. Such arrangements are particularly effective in reducing the impact of multi path interference, but it comes at a cost. As the separation between the early and late correlators is reduced below one chip width, the interval over which the discriminator behaves linearly also decreases. While this may not be a problem when the tracking loop is operating near the correct solution, performance during acquisition and the early stages of tracking can suffer, with degraded pull-in performance.

Conventional GPS receiver design involves a code-tracking loop whose job is to maintain temporal alignment between the arriving coarse/acquisition (C/A) code and the replica code produced by the local code generator. This is accomplished with the help of output from two correlators. One correlator employs a locally generated code sequence that is advanced a fraction of a chip interval relative to the prompt position, and is known as the early correlator. The second correlator operates with the locally generated code sequence delayed a fraction of a chip interval relative to the prompt position, and is known as the late correlator. Ideally, the correlation function exhibits triangular behavior (See FIG. 1) with a peak at the prompt position and it decreases linearly as a function of the misalignment, out to a misalignment of one chip interval on either side of the peak. This behavior is illustrated in the following.

$$cor(x) = \begin{cases} 1 - |x| & \text{for } |x| \leq 1 \\ 0 & \text{for } |x| > 1 \end{cases}$$

Let CE represent the output of the early correlator and CL the output of the late correlator. The conventional method then considers these two correlator values to be located on opposite sides of the correlation peak. In that case:

$CE(x,\Delta,ampl)=ampl*cor(x-\Delta/2);$ $CL(x,\Delta,ampl)=ampl*cor(x+\Delta/2);$ where $\Delta$ represents the displacement between the early and late correlators (i.e. temporal delay between two selected correlator values). The early and late correlators are assumed to be equally spaced by the amount $\Delta/2$ on either side of the prompt correlator.

It is assumed that CE is to the left of the peak and CL is to the right. Under these conditions:

$CE=ampl*(1-\Delta/2+x)$ $CL=ampl*(1-\Delta/2-x)$

These equations can be solved for x to obtain $$x_2 = (1 - \Delta/2)\frac{CE - CL}{CE + CL} \qquad (1)$$

with ampl having been eliminated. The subscript 2 is used to distinguish this particular solution from alternative solutions that follow.

Technically, this solution is only valid when $|x_2| \leq \Delta/2$, but this equation is commonly used as a discriminator in the code loop without regard for this limitation. The case where $\Delta$ is set equal to the width of a code chip interval then becomes:

$\Delta=1;$ $x_2(CE(x,\Delta,ampl), CL(x,\Delta,ampl), \Delta)=x$ for $|x|\leq\Delta/2=½$ As desired, $x_2$ behaves as a linear function of x over the range $+/-(\Delta/2)$. This means that the discriminator is providing an accurate estimate of the amount of misalignment between the arriving C/A code and the local code generator over this range. Outside this range, it no longer provides this linear response. Instead, it saturates at a value of $+/-\Delta/2$.

When $\Delta$ is reduced to only 0.2 of the code chip interval, then this solution is only valid for $|x|\leq\Delta/2=0.1$ chip intervals. In the central region between −0.1 and 0.1, the discriminator behaves linearly, just as it did when $\Delta$ was set to 1. However, outside this range the curve increases more slowly than it would have if the linear behavior had continued. (See FIG. 2). That means for displacements between $\Delta/2$ and $1-(\Delta/2)$, the discriminator value will be smaller than the actual misalignment amount. As a result, the code loop will make smaller corrections than it should, and hence the loop will not reach the desired tracking position as quickly. As a result, the pull-in behavior of the loop is degraded. The curve eventually reaches a value of 0.9 for a position on the horizontal axis equal to 0.9. This is larger than the saturation value obtained above when $\Delta$ was set to 1. So, for large misalignments greater than about 0.8 code chip intervals, the loop response will be better in this latter case than in the former.

Therefore, there exists a need for the linear behavior of the discriminator to extend over a greater range when the early to late correlator spacing $\Delta$ is on the order of 0.2 or 0.1 code chip intervals thereby improving pull-in performance.

SUMMARY OF THE INVENTION

The present invention provides systems and methods for avoiding non-linear behavior of conventional early-minus-late correlator-based code loop discriminators. The present invention provides a model of correlator behavior that takes into account whether both correlators are on the same side of the correlation peak or whether they straddle the peak. The result is a piecewise solution that can be stitched together quite readily to produce an extended range of linear response, thereby improving the pull-in capability of GPS code loops when closely spaced correlators are being used.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 1:
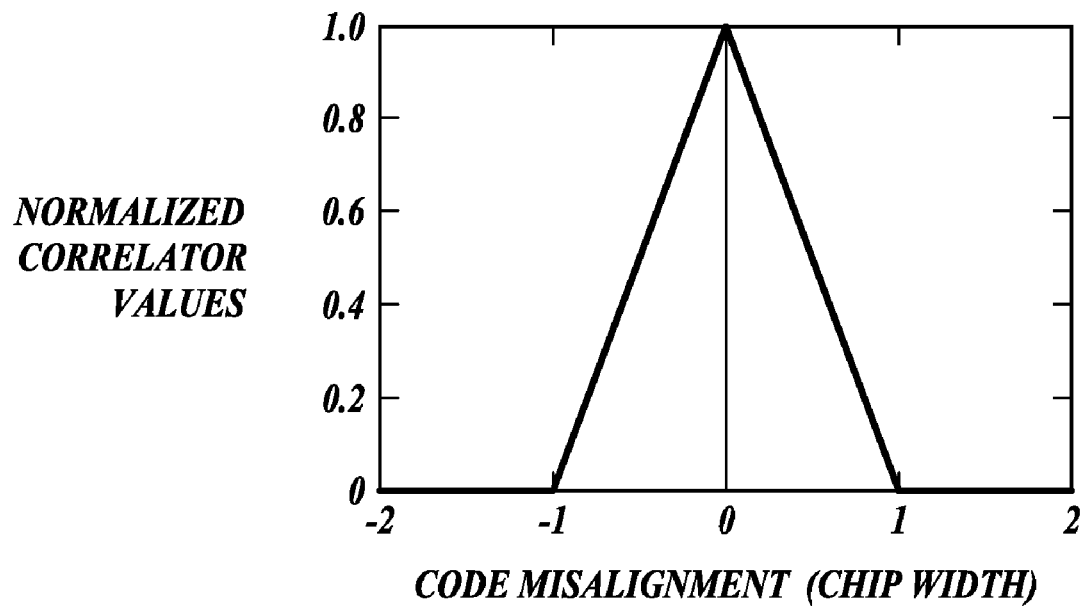
FIGS. 1 and 2 are plots as defined by the prior art.
Figure 2:
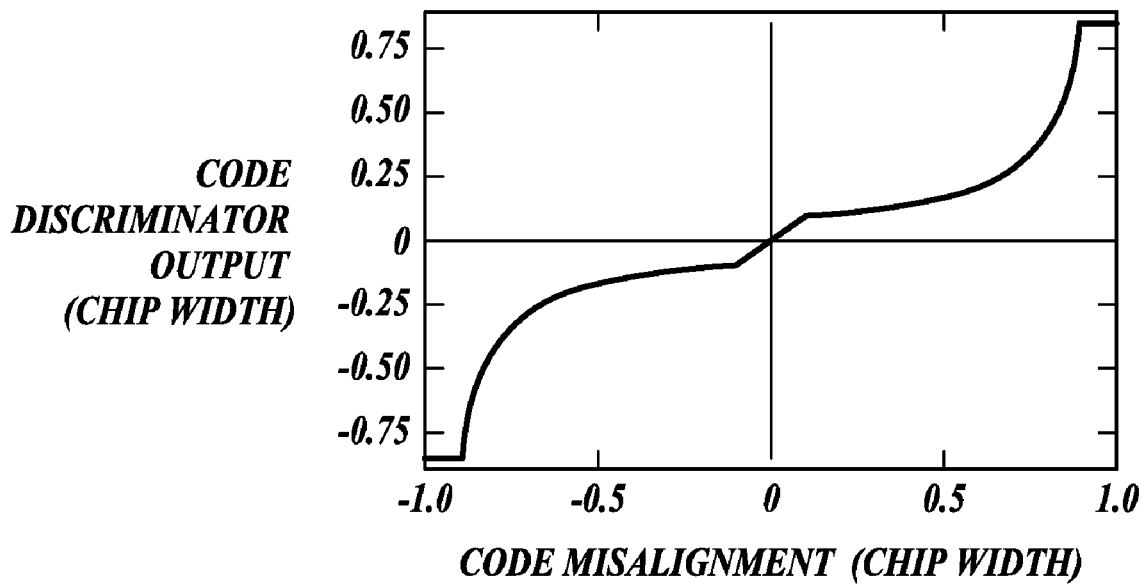
Figure 3:
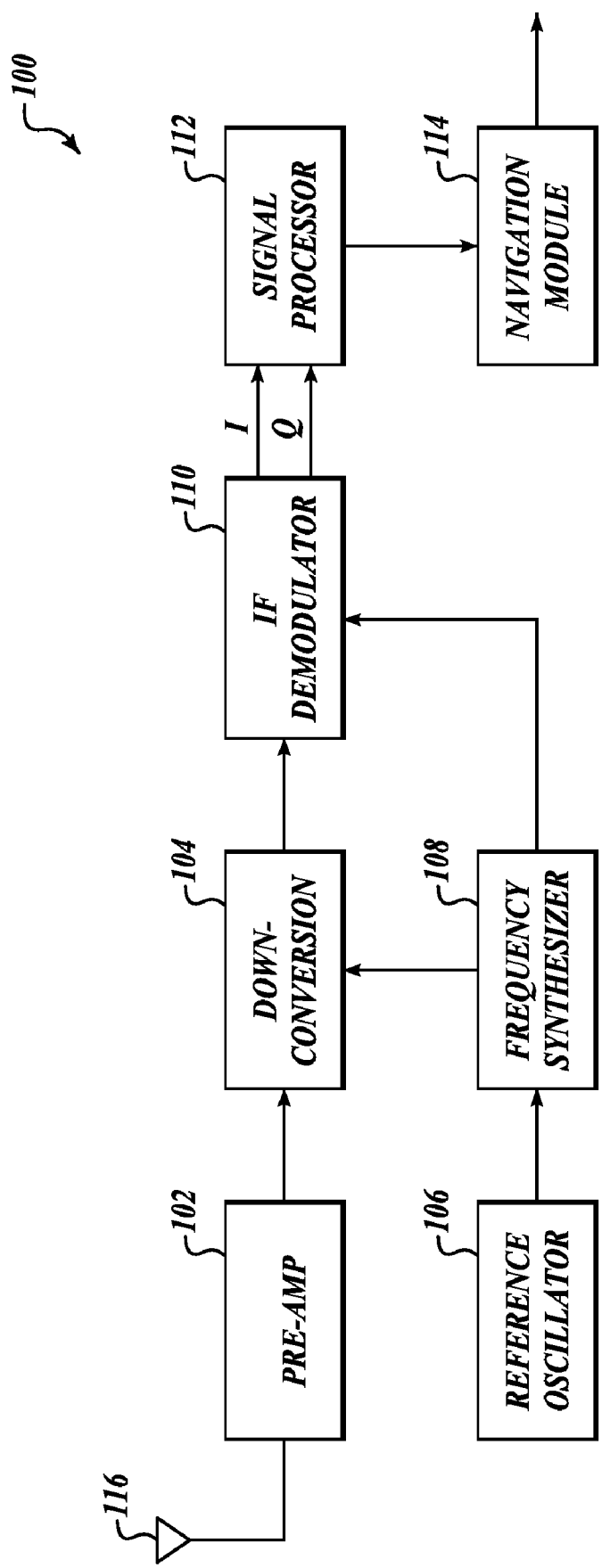
FIG. 3 is a schematic drawing of a GPS receiver formed in accordance with an embodiment of the present invention.

FIG. 3 illustrates a block diagram of a GPS receiver 100 in accordance with an embodiment of the invention. It should be readily apparent to those of ordinary skill in the art that the block diagram depicted in FIG. 3 represents a generalized schematic illustration and that other components may be added or existing components may be removed or modified. Moreover, the GPS receiver 100 may be implemented using various components. These components may be software components, hardware components, firmware, or any combination thereof.

As shown in FIG. 3, the GPS receiver 100 includes a pre-amp module 102, a down conversion module 104, a reference oscillator module 106, a frequency synthesizer module 108, an intermediate frequency (IF) demodulator 110, a signal processing module 112 and a navigation module 114.

A GPS signal is received at an antenna 116 and filtered by the pre-amp module 102. The filtered RF signal is then down-converted by the down conversion module 104. The down conversion module 104 is driven by a first local oscillator signal supplied by the frequency synthesizer module 108, which itself is driven by the reference oscillator 106. In addition, the frequency synthesizer module 108 provides a second local oscillator signal and a clock signal to the IF demodulator 110. The IF demodulator 110 then generates digital in-phase and quadrature (I & Q) channels by multiplication by sine and cosine versions of the second local oscillator signal.

The signal processing module 112 is configured to include a carrier loop and a code tracking loop (not shown). The signal processing module 112 also produces pseudorange, Doppler, and carrier phase outputs, which are then processed by the navigation processing module 114 to determine the receiver's position, velocity, and time.

Figure 4:
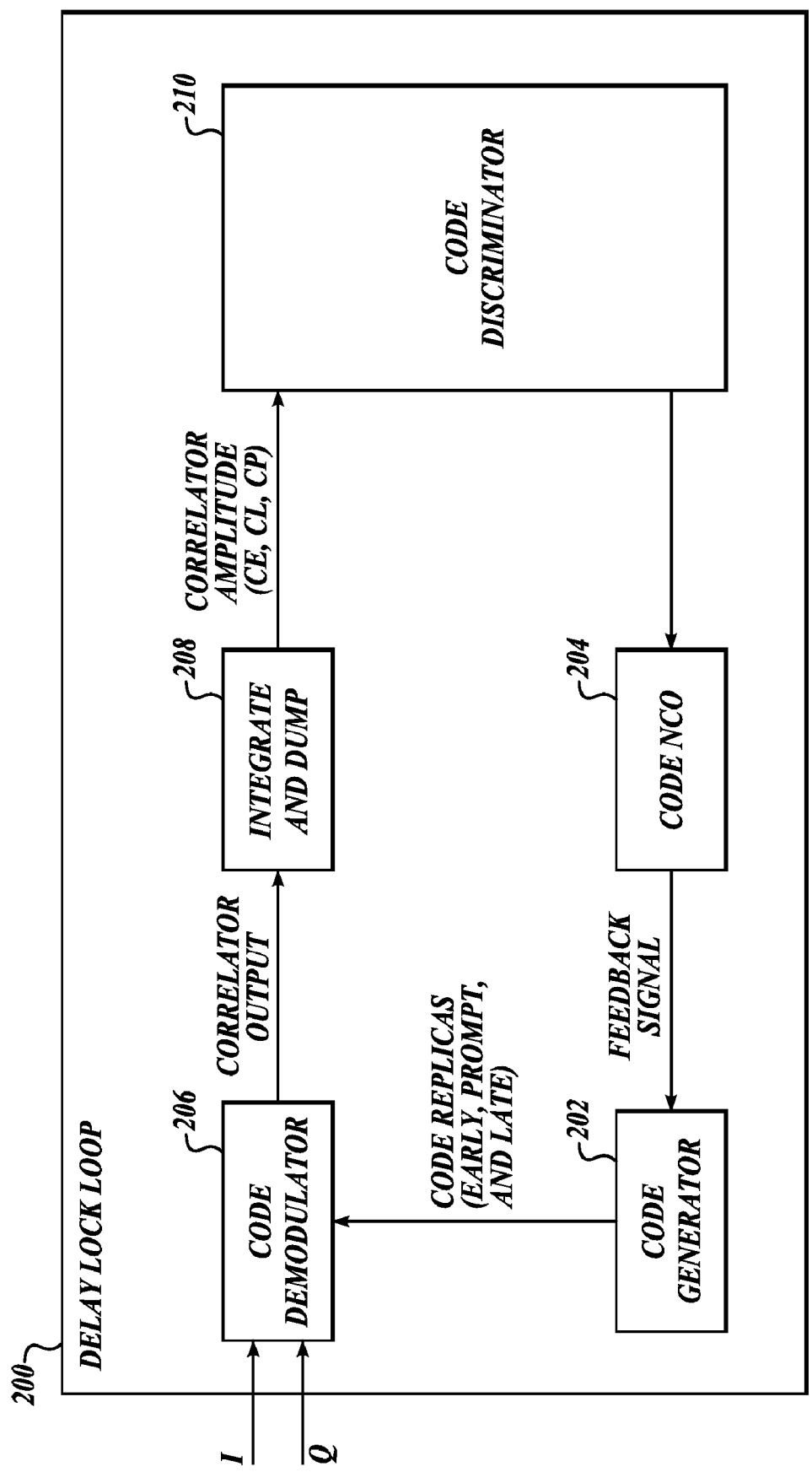
FIG. 4 is a schematic drawing of signal processor used in the GPS receiver shown in FIG. 3.

FIG. 4 illustrates a more detailed block diagram of the signal processing module 112 shown in FIG. 3 in accordance with another embodiment of the invention. As noted above, in order to track an incoming GPS signal, the signal processing module 112 employs two tracking loops—a delay lock loop (DLL) 200 and a phase lock loop (PLL). The DLL 200 is used to track the C/A code. The PLL (not shown) is used to track the carrier frequency of the incoming GPS signal. The DLL 200 includes a local code generator 202 and a code numerically controlled oscillator (NCO) 204.

The code generator 202 generates three different phases of local replica codes—Early, Prompt, and Late, which are separated from adjacent neighbors by at most ½ of a chip. The early code is advanced with respect to the prompt code and the late code is delayed with respect to the prompt code. At each instant in time, 6 products are produced: early code x I, early code x Q, prompt code x I, prompt code x Q, late code x I and late code x Q. Each of these six values is added respectively to one of six integrators until it is time to dump the result. The result is 6 correlator values.

The integrate and dump module 208 sums the squares of the I and Q correlator values for each of the early, prompt, and late correlators. Then, the sums are square rooted to produce correlator values, CE, CP, CL. The correlator values are then provided to the code discriminator 210.

The code discriminator 210 calculates an output by comparing the correlator values. The output is then fed back to the code NCO 204 to generate a feedback signal to the code generator 202. The code generator 202 may then adjust its rate or phase based on the feedback signal. If observations provide values that are directly related to the amount of correction that is needed (as is the case with our discriminator and its improved linearity of response), then convergence (pull in) is faster and better behaved than is the case when the relationship between the observation and the correction departs from linearity.

Each of the three pairwise combinations of CE, CP and CL could be used to produce three discriminator results that could be combined in an appropriate manner to arrive at a final result. But only one pairwise combination is required to obtain a valid solution. Common practice has been to rely on the (CE,CL) pair.

Assume that both the early and late correlators are placed in positions to the left of the correlation peak. Under these conditions, the following expressions apply:

$$CE = ampl^*(1-\Delta/2+x) \quad (2)$$

$$CL = ampl^*(1+\Delta/2+x) \quad (3)$$

CE is the same as before, but notice the change in the signs in the CL term. Equations 2 and 3 are solved for x in terms of CE, CL and $\Delta$ (ampl again drops out), to obtain:

$$x_3(CE, CL, \Delta) = -1 - \Delta/2 \frac{CE + CL}{CE - CL} \quad (4)$$

where the subscript 3 is used to distinguish this solution from the previous one denoted by a subscript of 2.

This result is valid when both correlators are located to the left of the correlation peak, or equivalently whenever $-1+\Delta/2 \leq x \leq 1-\Delta/2$. The difference between the early and late correlator values appears in the denominator and the sum in the numerator. Only $\Delta/2$ is multiplied by the ratio of correlator terms; the leading $-1$ term stands by itself.

This same process is repeated for the case where the early and late correlators are both to the right of the correlation peak, in which case the expressions become:

$$CE = ampl^*(1+\Delta/2-x) \quad (5)$$

$$CL = ampl^*(1-\Delta/2-x) \quad (6)$$

In this case, the solution takes the form:

$$x_4(CE, CL, \Delta) = 1 - \Delta/2 \frac{CE + CL}{CE - CL} \quad (7)$$

This solution is now valid whenever $\Delta/2 \leq x \leq 1-\Delta/2$. Because the value of x is unknown, the sign of CE−CL is checked. If the sign is positive, Equation 7 is used. If the sign is negative, Equation 4 is used. This is written as follows:

$$x_5(CE, CL, \Delta) = 1 - \Delta/2 \frac{CE + CL}{CE - CL} \text{ for } (CE - CL) > 0 \quad (8)$$

$$x_5(CE, CL, \Delta) = -1 - \Delta/2 \frac{CE + CL}{CE - CL} \text{ for } (CE - CL) \leq 0 \quad (9)$$

with the subscript 5 indicating that we have combined the two solutions previously designated by subscripts 3 and 4.

Figure 5:
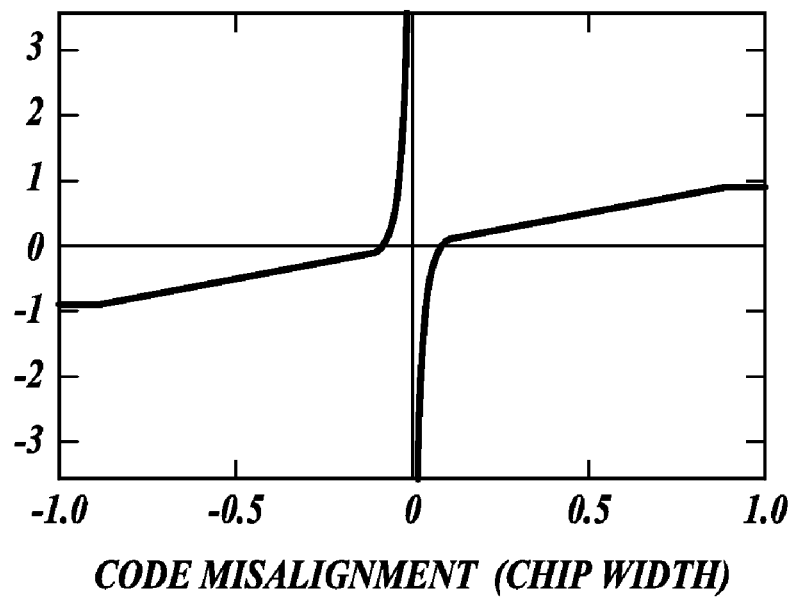
FIGS. 5-8 are graphs of equation results produced by the signal processor.

Equations 8 and 9 are plotted as shown in FIG. 5.

In this case, for the regions where the appropriate model is used, the desired linear behavior is achieved. In the central portion of the plot, where the correlator positions straddle the peak rather than both being on the same side of the peak, an undesirable answer is achieved. Equation 1 is always negative when x is to the left of the origin, and always positive when x is to the right of the origin. To the left of the origin, the more negative of Equations 1 and 9 is desired. To the right of the origin, the more positive of Equations 1 and 8 is desired. Therefore:

$$\text{Discrim} = \text{Min}[\text{Eq. 1, Eq. 9}] \text{ for } (CE-CL) \leq 0 \quad (10)$$

$$\text{Discrim} = \text{Max}[\text{Eq. 1, Eq. 8}] \text{ for } (CE-CL) > 0 \quad (11)$$

Figure 6:
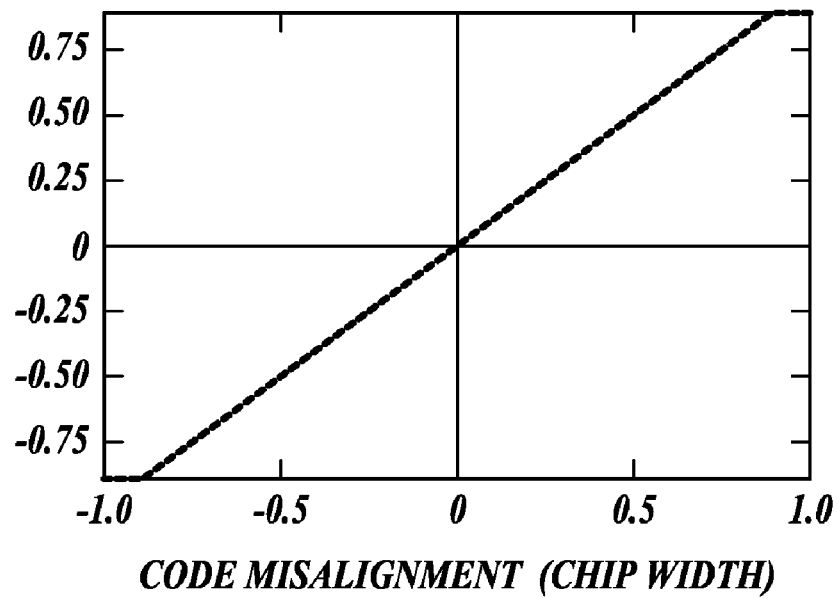

As above, the result is plotted across the entire range from minus one code chip interval to plus one code chip interval (see FIG. 6). The desired linear behavior across the range from $-1+\Delta/2$ to $1-\Delta/2$ is attained, with saturation setting in outside of this range.

Figure 7:
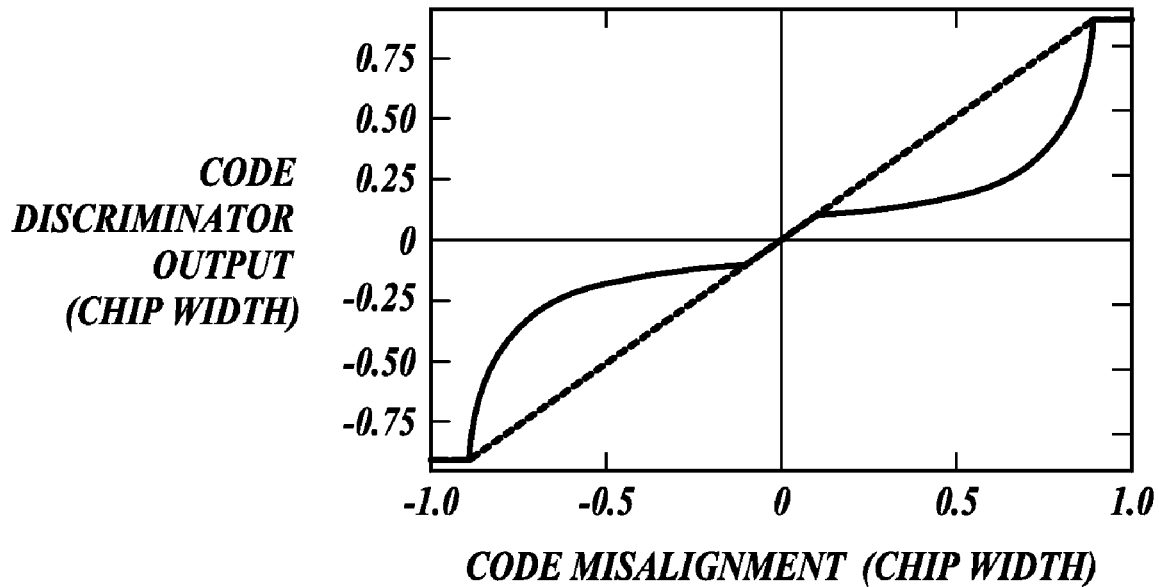

FIG. 7 shows two curves (both for the case where $\Delta=0.2$ code chip intervals)—one curve is for the Equation 1 solution (diverges from linearity and provides an underestimate of the actual misalignment between the arriving C/A code and the locally generated C/A code outside of the central linear region) and the linear dotted line is for Equations 10 and 11 solutions (linear behavior over a range from $-0.9$ to $0.9$). This is a nine-fold increase in the linear operating range. As a result, a code loop is able to converge more rapidly to the correct alignment of the code.

Figure 8:
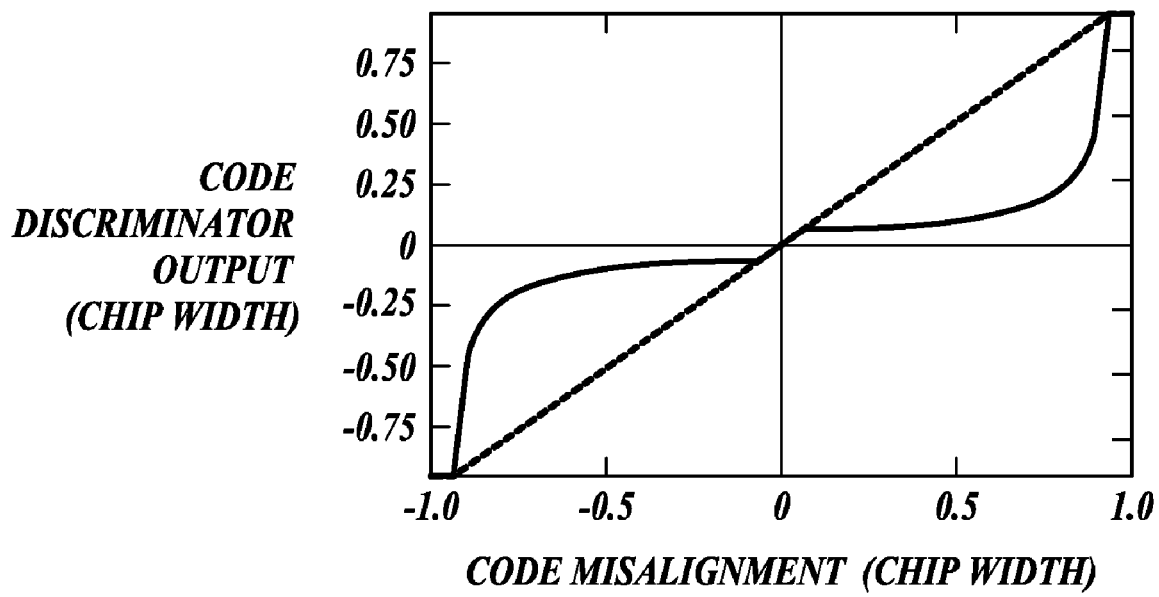

FIG. 8 shows curves similar to those shown in FIG. 7 but when $\Delta$ is reduced to 0.1 code chip intervals. The amount of improvement provided by this technique increases as $\Delta$ decreases.

This linear result provides a direct relationship between the measurement and the amount of adjustment needed to make to the phase (temporal delay) of the local code generator. From the measurement, one can compute the amount of correction needed without being hindered by the departure from linearity that occurs in the conventional prior art. If the discriminator value comes out to be a value of x, then the local code generator needs to shift by that amount. Noise consideration may require that all corrections are reduced by some proportionality constant. But the key is, the present invention will always be closer to the correct adjustment value and hence will pull in faster.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The invention claimed is:

1. A method for aligning coarse/acquisition (C/A) code and a locally generated code signal at a global positioning system (GPS) receiver, the method comprising:
   receiving a signal from GPS satellite, wherein the received signal includes a C/A code;
   generating a local code signal at a local code generator;
   generating first and second correlator values based on the received C/A code and the local code signal;
   determining a sum of the first and second correlator values;
   determining a difference of the first and second correlator values;
   dividing the determined summation by the determined difference; and
   aligning the C/A code with the local code generated by the local code generator based on the result of the division.

2. The method of claim 1, wherein the first correlator value and the second correlator value are at least two of an early, prompt or late correlator value.

3. The method of claim 2, further comprising:
   dividing the determined difference by the determined summation,
   wherein aligning is further based on the result of the division of the determined difference by the determined summation.

4. The method of claim 3, wherein aligning is further based on the following:

$$\text{Min}\left[(1-\Delta/2)\frac{CE-CL}{CE+CL}, -1-\Delta/2\frac{CE+CL}{CE-CL}\right] \text{ for } (CE-CL) \leq 0;$$

and $$\text{Max}\left[(1-\Delta/2)\frac{CE-CL}{CE+CL}, 1-\Delta/2\frac{CE+CL}{CE-CL}\right] \text{ for } (CE-CL) > 0,$$

where
CE = early correlator value;
CL = late correlator value; and
$\Delta$ = temporal delay between the correlator values.

5. The method of claim 3, wherein aligning is further based on the following:

$$\text{Min}\left[(1-\Delta/2)\frac{CE-CL}{CE+CL}, -1-\Delta/2\frac{CE+CL}{CE-CL}\right] \text{ for } (CE-CL) < 0; \text{ and}$$

$$\text{Max}\left[(1-\Delta/2)\frac{CE-CL}{CE+CL}, 1-\Delta/2\frac{CE+CL}{CE-CL}\right] \text{ for } (CE-CL) \geq 0,$$

where
CE = early correlator value;
CL = late correlator value; and
$\Delta$ = temporal delay between the correlator values.

6. A system for aligning coarse/acquisition (C/A) code and a locally generated code signal at a global positioning system (GPS) receiver, the system comprising:
   a receiver configured to receive a signal from a GPS satellite, wherein the received signal includes a C/A code;
   a signal processor configured to generate a local code signal, generate first and second correlator values based on the received C/A code and the local code signal, determine a sum of the first and second correlator values, determine a difference of the first and second correlator values, divide the determined summation by the determined difference, and align the C/A code with the local code generated by the local code generator based on the result of the division.

7. The system of claim 6, wherein the first correlator value and the second correlator value are at least two of an early, prompt or late correlator value.

8. The system of claim 7, wherein the signal processor further divides the determined difference by the determined summation, wherein the signal processor aligns further based on the result of the division of the determined difference by the determined summation.

9. The system of claim 8, wherein the signal processor aligns based on the following:

$$\text{Min}\left[(1-\Delta/2)\frac{CE-CL}{CE+CL}, -1-\Delta/2\frac{CE+CL}{CE-CL}\right] \text{ for } (CE-CL) \leq 0; \text{ and}$$

$$\text{Max}\left[(1-\Delta/2)\frac{CE-CL}{CE+CL}, 1-\Delta/2\frac{CE+CL}{CE-CL}\right] \text{ for } (CE-CL) > 0,$$

where
CE = early correlator value;
CL = late correlator value; and
$\Delta$ = temporal delay between the correlator values.

10. The system of claim 8, wherein the signal processor aligns based on the following:

$$\text{Min}\left[(1-\Delta/2)\frac{CE-CL}{CE+CL}, -1-\Delta/2\frac{CE+CL}{CE-CL}\right] \text{ for } (CE-CL) < 0; \text{ and}$$

$$\text{Max}\left[(1-\Delta/2)\frac{CE-CL}{CE+CL}, 1-\Delta/2\frac{CE+CL}{CE-CL}\right] \text{ for } (CE-CL) \geq 0,$$

where
CE = early correlator value;
CL = late correlator value; and
$\Delta$ = temporal delay between the correlator values.

* * * * *